(12) United States Patent
Muylaert

(10) Patent No.: US 6,413,048 B1
(45) Date of Patent: Jul. 2, 2002

(54) ELASTOMERIC BEARING

(75) Inventor: Neal W. Muylaert, Apache Junction, AZ (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 09/676,737

(22) Filed: Sep. 29, 2000

(51) Int. Cl.⁷ .................................................. B63H 1/06
(52) U.S. Cl. .................................. 416/134 A; 384/221
(58) Field of Search .......................... 416/134 A, 191, 416/244 R, 244 B, 106, 107, 160, 135; 74/60, 839; 384/221, 271, 563

(56) References Cited

U.S. PATENT DOCUMENTS

| | | | | |
|---|---|---|---|---|
| 2,482,488 A | * | 9/1949 | Julien | 267/33 |
| 2,593,335 A | * | 4/1952 | Neale | 416/107 |
| 2,949,967 A | * | 8/1960 | Johanovich | 416/134 A |
| 3,200,887 A | | 8/1965 | Ballauer | |
| 3,652,185 A | * | 3/1972 | Cresap et al. | 416/134 |
| 4,129,403 A | * | 12/1978 | Watson | 416/134 A |
| 4,131,391 A | * | 12/1978 | Robinson | 416/140 |
| 4,142,833 A | * | 3/1979 | Rybicki et al. | 416/134 A |
| 4,395,143 A | | 7/1983 | Bakken et al. | |
| 4,815,937 A | * | 3/1989 | Aubry et al. | 416/140 A |
| 4,859,148 A | | 8/1989 | Hibyan | |
| 4,930,983 A | | 6/1990 | Byrnes et al. | |
| 5,033,722 A | * | 7/1991 | Lammers | 267/141.1 |
| 5,059,094 A | | 10/1991 | Robinson et al. | |
| 5,096,380 A | | 3/1992 | Byrnes et al. | |
| 5,383,767 A | | 1/1995 | Aubry | |
| 5,620,305 A | | 4/1997 | McArdle | |

FOREIGN PATENT DOCUMENTS

GB        2 057 592 A      4/1981

* cited by examiner

*Primary Examiner*—Edward K. Look
*Assistant Examiner*—Igor Kershteyn
(74) *Attorney, Agent, or Firm*—Harness Dickey & Pierce P.L.C.

(57) ABSTRACT

An elastomeric bearing for the flapping hinge of a helicopter is disclosed. The elastomeric bearing includes an outer race, an inner race, and an elastomeric element disposed therebetween. The outer race has at least one flange extending therefrom that includes a plurality of shear bolt holes such that a redundant load path is formed from one shear bolt hole to another. The elastomeric element is preloaded by applying a predetermined force to the outer race.

20 Claims, 3 Drawing Sheets

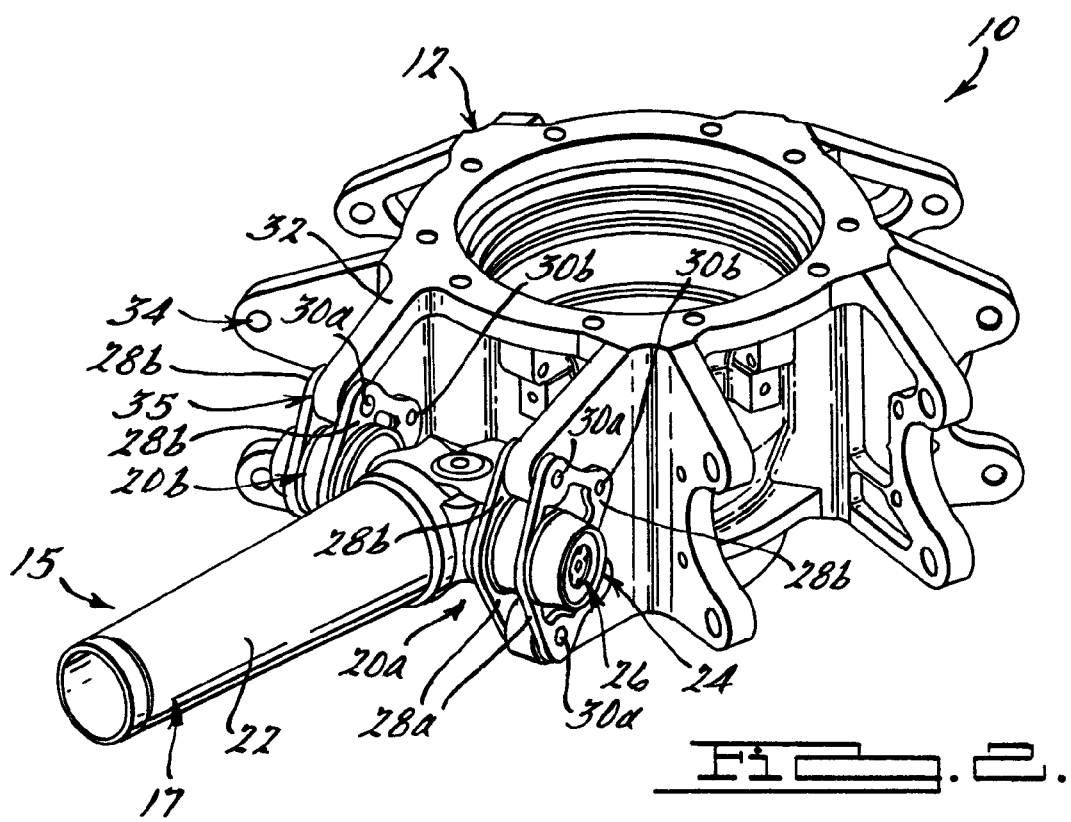
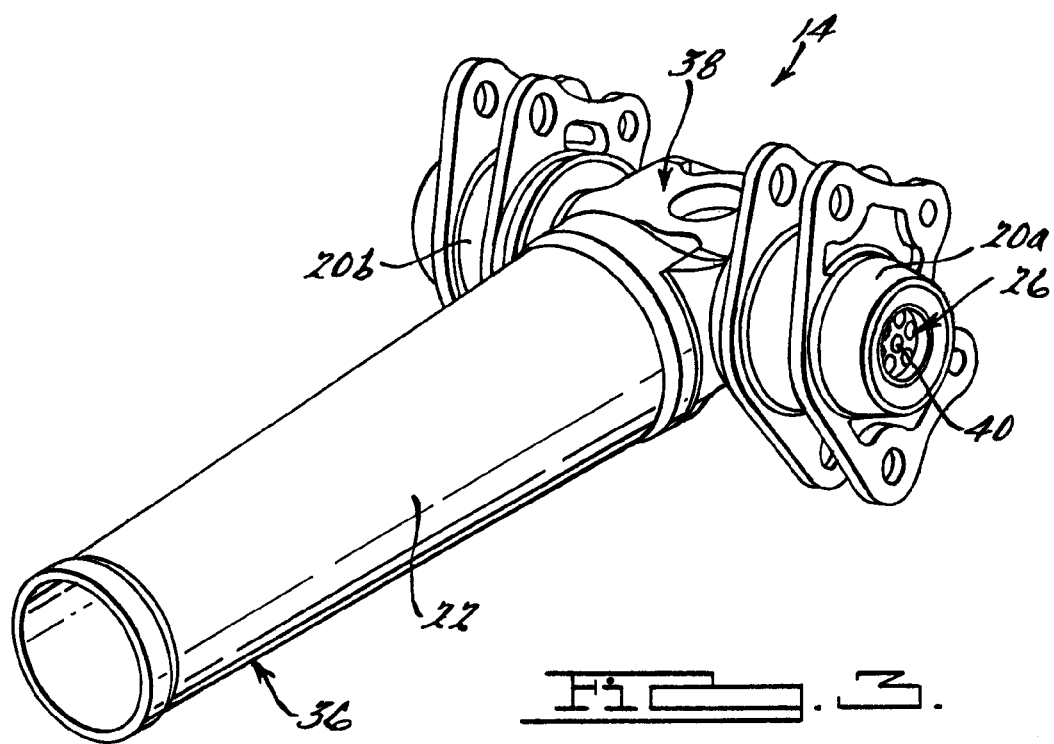

ELASTOMERIC BEARING

BACKGROUND OF THE INVENTION

1. Technical Field

The present invention relates generally to rotor blade bearings for helicopters. More particularly, the present invention is directed to an elastomeric bearing for the flapping hinge of a helicopter.

2. Discussion

During horizontal flight of a helicopter, the difference in relative airspeed of the rotor blades causes an uneven lift between the blades. To compensate for this uneven lift, a flapping hinge is used to allow the rotor blades to vertically flap such that the rise or drop in a rotor blade compensates for the relative difference in lift between blades.

In the past, metal pin bearings have been used in the flapping hinge. These metal hinges suffer from high maintenance requirements and low bearing lives. Over the past 20 years, elastomeric bearings have become a worldwide industry standard in helicopter rotor systems. Elastomeric bearings provide greatly extended bearing lives while also reducing maintenance requirements.

A typical prior art elastomeric bearing generally includes a body with an elastomeric element therein, a hole through the center of the body for connection to the rotor hub, and a flange connected to the blades. Typically, installation of an elastomeric bearing includes assembling the rotor hub, taking a preload reading, disassembling the rotor hub, applying a preload and shim to the bearing, and reassembling the hub. This complicates installation and any maintenance that must be preformed on the bearing.

While prior art elastomeric bearings are useful, they are not without limitations. For example, the connection between an elastomeric bearing and the rotor hub typically involves only one, non-redundant, fastener. Failure of the single fastener can have catastrophic consequences on the helicopter. In military applications, this single fastener is of special concern wherein ballistic hits to the rotor hub are a possibility.

Accordingly, it is desirable to provide an elastomeric bearing that includes a redundant load path while also simplifying the installation process, thereby reducing installation and maintenance complexity.

SUMMARY OF THE INVENTION

In accordance with the teachings of the present invention, an elastomeric bearing for the flapping hinge of a helicopter is disclosed. The elastomeric bearing includes an outer race, an inner race, and an elastomeric element disposed therebetween. The outer race has at least one flange extending therefrom. A plurality of shear bolt holes are included in the flange such that a redundant load path is formed from one shear bolt hole to another. The elastomeric element is preloaded by applying a predetermined force to the outer race.

BRIEF DESCRIPTION OF THE DRAWINGS

Additional advantages and features of the present invention will become apparent from the subsequent description and the appended claims, taken in conjunction with the accompanying drawings.

FIG. 2 is a more detailed perspective view of the main rotor hub and bearing tie bar assembly of FIG. 1;

FIG. 3 is a more detailed perspective view of the bearing tie bar assembly of FIG. 2;

DETAILED DESCRIPTION OF THE PREFERRED EMBODIMENTS

The present invention is directed towards an elastomeric bearing for the flapping hinge of a helicopter. The elastomeric bearing has a plurality of bolt hole connections that create redundant load paths when fastened to the helicopter. Furthermore, the design of the bearing is such that the elastomer within the bearing may be preloaded for installation without disassembling the bearing.

Figure 1:
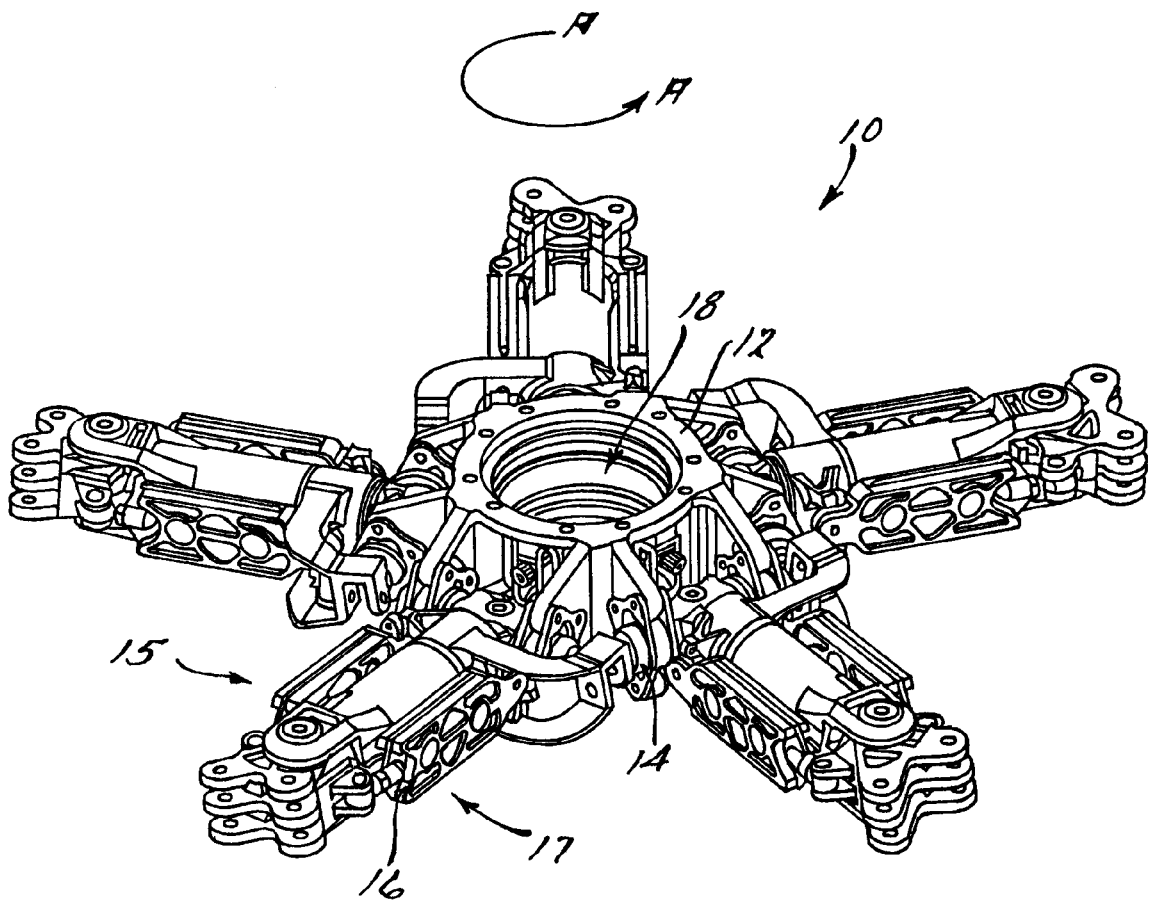
FIG. 1 is a perspective view of the main rotor hub assembly of a helicopter.

Referring now to the drawings in which like reference numerals designate like or corresponding parts throughout the several views, there is shown in FIG. 1 a main rotor hub assembly 10 of a helicopter. The main rotor hub assembly 10 includes a main hub 12, five bearing tie bar assemblies 14 radially coupled to the main hub 12, and five rotor arm assemblies 16 radially coupled to the bearing tie bar assemblies 14. It is to be understood that the use of five bearing tie bar assemblies 14, and five rotor arm assemblies 16 is only exemplary in nature, and that as few as two bearing tie bar assemblies 14 and rotor arm assemblies 16 may be used. Each rotor arm assembly includes a lagging edge 15 and a leading edge 17.

The main hub 12 defines a central mast sleeve 18 for receiving the mast of a helicopter (not shown). The rotor arm assemblies 16 are rigidly secured to the bearing tie bar assemblies 14 so as to laterally project therefrom. The bearing tie bar assemblies 14 are connected to the main hub 12 equidistant from one another and extend radially outward therefrom. This connection, as described below, forms a flapping hinge and allows the bearing tie bar assembly 14 and rotor arm assemblies 16 to pivot vertically relative to the main hub 12. In operation, the main hub 12 rotates in a direction indicated in FIG. 1 by the arrow A—A.

FIG. 2 is a more detailed view of the rotor hub assembly 10. For illustration purposes, the rotor arm assemblies 16 have been removed and all but one bearing tie bar assembly 14 has been removed so that the connection to the main rotor hub 12 may be clearly shown. The bearing tie bar assembly 14 includes a leading edge elastomeric bearing 20a, a lagging edge elastomeric bearing 20b, and a tie bar housing 22 oriented with lagging edge 15 to the left and leading edge 17 to the right in the figure. Each elastomeric bearing 20 includes a body 24, conically shaped in the exemplary embodiment, with a bearing sleeve 26 coaxially extending through the center of the body 24. Two spaced apart lower flanges 28a and two spaced apart upper flanges 28b extend away from the body 24. Each flange 28 has two outboard shear bolt holes 30a and two inboard shear bolt holes 30b formed therethrough. In this way, each flange 28 has a first shear bolt hole 30a and a redundant load path to the other shear bolt hole 30b. It is to be understood that the use of two pairs of flanges 28a and 28b with two bolt holes 30a and 30b is exemplary in nature, and any number of flanges and bolt holes may be used so long as a redundant load path is maintained.

The hub 12 includes at least one mounting arm or surface 32 extending therefrom. Each mounting surface 32 has bolt holes 34 formed therethrough that coaxially align with the shear bolt holes 30 in the elastomeric bearing 20. The bearing 20 is fastened at the shear bolt holes 30 to the mounting surface 32 such that opposing flanges 28a and 28b are adjacent opposite sides of the mounting surface 32. As will be described in greater detail below, a measured and shimmed gap 35 is defined between the upper outboard flange 28b and the mounting surface 32.

The bearing tie bar assembly 14 is shown in greater detail in FIG. 3. The tie bar housing 22 includes a shaft 36 and a base 38. The shaft 36 is adapted to receive the rotor arm assembly 16 (FIG. 1) as is known in the art. The base 38 is connected to the body 24 of leading and lagging bearings 20a and 20b using conventional fastening mechanisms. In the exemplary embodiment, a plurality of dowel pins 40 extend through the bearing sleeve 26 of the body 24 into the base 38 to fix the tie bar housing 22 from rotation relative to the dowel pins 40.

Figure 4:
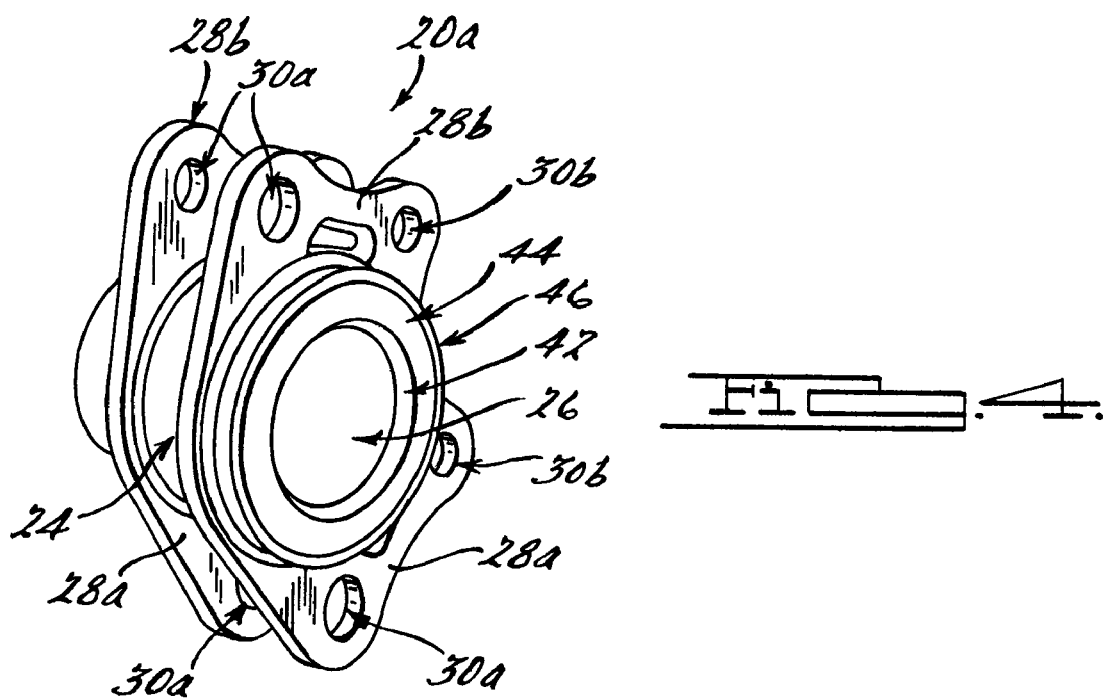
FIG. 4 is a first perspective view of the elastomeric bearing of the present invention.
Figure 5:
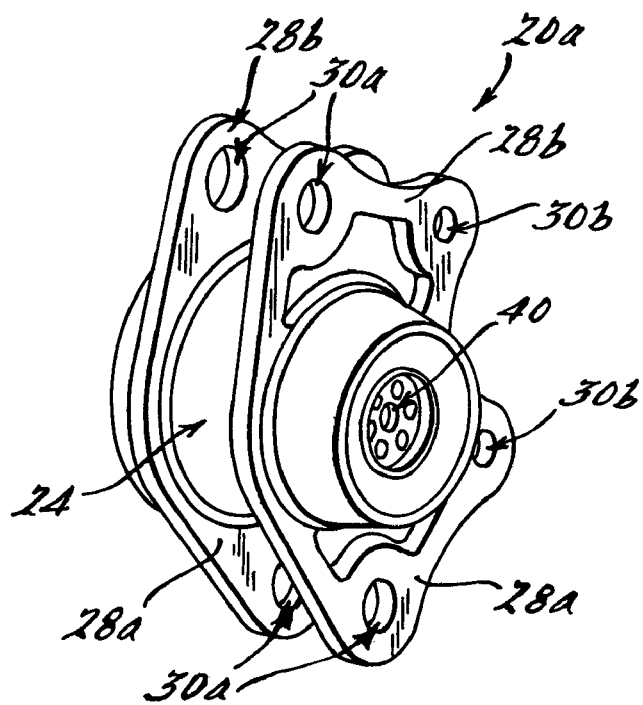
FIG. 5 is a second perspective view of the elastomeric bearing of the present invention.

FIGS. 4 and 5 show detailed views of the elastomeric bearing 20a. Although only bearing 20a is illustrated, it is to be understood that the bearing 20b is a mirror image thereof. The bearing sleeve 26 is defined by an inner race 42. The dowel pins 40 are rigidly secured to the inner race 42. An elastomeric element 44, multilayered in the preferred embodiment, is circumferentially disposed outboard of the inner race 42. An outer race 46 is circumferentially disposed outboard of the elastomeric element 44 and forms the outer portion of the body 24. The inner race 42 and outer race 46 move relative to one another by the compression or expansion of the elastomeric element 44. This allows the rotor arm assembly 16 (FIG. 1), interconnected to the bearing 20 via the tie bar housing 22 (FIG. 2) and dowel pins 40, to flap in a vertical direction when the forces on the helicopter blades are uneven.

Referring now to FIGS. 2–5 collectively, the rotor arm assembly 16 or the tie bar assembly 14 is installed by first attaching the leading edge bearing 20a to the mounting surface 32 of the main hub 12 by installing and tightening four bolts through the inboard and outboard shear bolt holes 30a and 30b. Two bolts are then installed in the inboard shear bolt holes 30b of the lagging edge bearing 20b but are not tightened. The gap 35 between the lagging edge mounting surface 32 on the main hub 12 and the upper flange 28b (in this case the flange 28b which is on the side of the mounting surface 32 opposite the tie bar housing 22) of the lagging edge bearing 20b is measured with a feeler gauge. A pre-determined amount for tolerance is then subtracted from the feeler gauge measurement and a shim is then placed into the gap 35. Two bolts are then installed in the outboard shear bolt holes 30a and all four bolts in the lagging edge bearing 20b are tightened. The axial force applied to the bearing flanges 28 applies the preload to the elastomeric bearing element 44.

As described above, the present invention provides a redundant shear load path in an elastomeric bearing such that failure near one shear bolt does not critically damage the entire main rotor assembly. Furthermore, by applying the preload to the outer race of the bearing, the installation and maintenance of the elastomeric bearing is greatly simplified.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A bearing assembly comprising:
   a cylindrical body;
   a first flange radially extending from said body, said first flange including a first pair of bolt holes formed therethrough; and
   a second flange radially extending from said body generally opposite said first flange relative to said body, said second flange including a second pair of bolt holes formed therethrough.

2. The bearing assembly of claim 1, wherein said body includes a third flange radially extending from said body and axially spaced apart from said first flange along said body, said third flange including a third pair of bolt holes formed therethrough, said third pair of bolt holes cooperating with said first pair of bolt holes to provide a first redundant load path for mounting said bearing assembly to a mounting surface disposed between said first and third flanges.

3. The bearing assembly of claim 2, wherein said body includes a fourth flange radially extending from said body generally opposite said third flange relative to said cylindrical body and axially spaced apart from said second flange along said body, said fourth flange including a fourth pair of bolt holes formed therethrough, said fourth pair of bolt holes cooperating with said second pair of bolt holes to provide a second redundant load path for mounting said bearing assembly to a mounting surface disposed between said second and fourth flanges.

4. The bearing assembly of claim 1, wherein said body includes an inner race and an outer race with an elastomeric element disposed therebetween.

5. The bearing assembly of claim 4, wherein said bearing further comprises means for preloading said outer race without removing said bearing from a mounting surface.

6. The bearing assembly of claim 4, wherein said elastomeric element is multilayered.

7. The bearing assembly of claim 4, wherein said inner and outer races are conical.

8. A method for installing a bearing between a main rotor hub and a tie bar housing in a flapping hinge comprising:
   attaching a first end flange of the bearing to the main rotor hub by a pair of bolt holes formed in the first end flange;
   applying a predetermined load to an outer race of the bearing;
   attaching a second end flange of the bearing to the main rotor hub by a second pair of bolt holes form in the second end flange; and
   attaching the tie bar housing to the bearing.

9. A method for installing a bearing between a main rotor hub and a tie bar housing in a flapping hinge comprising:
   attaching the bearing at a first end to the main rotor hub;
   applying a predetermined load to an outer race of the bearing;
   applying a shim along with said predetermined load to said outer race;
   attaching the bearing at a second end to the main rotor hub; and
   attaching the tie bar housing to the bearing.

10. A main rotor hub assembly of a helicopter comprising:
a generally cylindrical main rotor hub;
a first elongated mounting surface connected to and extending generally radially away from said main rotor hub, a major plane of said first elongated mounting surface being generally axially aligned with a longitudinal axis of said generally cylindrical main rotor hub;
a first bearing including a body and a first flange extending away from said body, said first flange including a pair of spaced apart bolt holes formed through said first flange, said first flange lying adjacent to a first side of said first mounting surface;
a pair of first bolts passing through said bolt holes of said first flange and connected to said first mounting surface; and
a tie bar housing coupled to said first bearing and extending radially away from said hub.

11. The main rotor hub assembly of claim 10 wherein said first bearing includes a second flange extending away from said body axially spaced apart from said first flange relative to said body, said second flange including a pair of spaced apart second bolt holes formed through said second flange, said second flange lying adjacent to a second side of said first mounting surface opposite said first side of said first mounting surface, said pair of first bolts passing through said pair of spaced apart second bolt holes of said second flange.

12. The main rotor hub assembly of claim 11, wherein said body of said first bearing is located within a recessed area of said first mounting surface and is oriented transverse to said major plane of said first mounting surface.

13. The main rotor hub assembly of claim 12 wherein said first bearing includes a third flange extending away from said body opposite from said first flange relative to said body, said third flange including a pair of spaced apart third bolt holes formed through said third flange, said third flange lying adjacent to said first side of said first mounting surface opposite said recessed area relative to said first flange, a pair of second bolts passing through said pair of spaced apart third bolt holes of said third flange and connected to said first mounting surface.

14. The main rotor hub assembly of claim 13 wherein said first bearing includes a fourth flange extending away from said body axially spaced apart from said third flange and opposite said second flange relative to said body, said fourth flange including a pair of spaced apart fourth bolt holes formed through said fourth flange, said fourth flange lying adjacent to said second side of said first mounting surface opposite said recessed area relative to said second flange, said pair of second bolts passing through said pair of spaced apart fourth bolt holes of said fourth flange.

15. The main rotor hub assembly of claim 14, further comprising:
a second elongated mounting surface connected to and extending generally radially away from said main rotor hub, a major plane of said second elongated mounting surface being generally axially aligned with a longitudinal axis of said generally cylindrical main rotor hub, said second mounting surface being circumferentially spaced apart from said first mounting surface relative to said hub; and
a second bearing including a body and a fifth flange extending away from said body, said fifth flange including a pair of spaced apart fifth bolt holes formed through said fifth flange, said fifth flange lying adjacent to a first side of said second mounting surface; and
a pair of third bolts passing through said bolt holes of said fifth flange and connected to said second mounting surface;
wherein said tie bar housing is coupled to said second bearing.

16. The main rotor hub assembly of claim 15 wherein said second bearing includes a sixth flange extending away from said body of said second bearing axially spaced apart from said fifth flange relative to said body, said sixth flange including a pair of spaced apart sixth bolt holes formed through said sixth flange, said sixth flange lying adjacent to a second side of said second mounting surface opposite said first side of said second mounting surface, said pair of third bolts passing through said pair of spaced apart sixth bolt holes of said sixth flange.

17. The main rotor hub assembly of claim 16, wherein said body of said second bearing is located within a recessed area of said second mounting surface and is oriented transverse to said major plane of said second mounting surface.

18. The main rotor hub assembly of claim 17 wherein said second bearing includes a seventh flange extending away from said body of said second bearing opposite from said fifth flange relative to said body, said seventh flange including a pair of spaced apart seventh bolt holes formed through said seventh flange, said seventh flange lying adjacent to said first side of said second mounting surface opposite said recessed area relative to said fifth flange, a pair of fourth bolts passing through said pair of spaced apart seventh bolt holes of said seventh flange and connected to said second mounting surface.

19. The main rotor hub assembly of claim 18 wherein said second bearing includes an eighth flange extending away from said body of said second bearing axially spaced apart from said seventh flange and opposite said sixth flange relative to said body, said eighth flange including a pair of spaced apart eighth bolt holes formed through said eighth flange, said eighth flange lying adjacent to said second side of said second mounting surface opposite said recessed area relative to said sixth flange, said pair of fourth bolts passing through said pair of spaced apart eighth bolt holes of said eighth flange.

20. A method for installing a bearing between a main rotor hub and a tie bar housing in a flapping hinge comprising:
attaching the bearing at a first end to the main rotor hub;
without disconnecting the bearing from the main rotor hub, applying a predetermined load to an outer race of the bearing;
attaching the bearing at a second end to the main rotor hub; and
attaching the tie bar housing to the bearing.

* * * * *